United States Patent
Vahdat et al.

(10) Patent No.: US 11,948,078 B2
(45) Date of Patent: Apr. 2, 2024

(54) JOINT REPRESENTATION LEARNING FROM IMAGES AND TEXT

(71) Applicant: Nvidia Corporation, Santa Clara, CA (US)

(72) Inventors: Arash Vahdat, Santa Clara, CA (US); Tanmay Gupta, Santa Clara, CA (US); Xiaodong Yang, Santa Clara, CA (US); Jan Kautz, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 893 days.

(21) Appl. No.: 17/000,048

(22) Filed: Aug. 21, 2020

(65) Prior Publication Data

US 2021/0056353 A1     Feb. 25, 2021

Related U.S. Application Data

(60) Provisional application No. 62/891,155, filed on Aug. 23, 2019.

(51) Int. Cl.
*G06N 3/08* (2023.01)
*G06F 18/214* (2023.01)
*G06F 18/22* (2023.01)
*G06V 10/74* (2022.01)
*G06V 10/82* (2022.01)
*G06V 30/19* (2022.01)
*G06V 30/262* (2022.01)

(52) U.S. Cl.
CPC ............ *G06N 3/08* (2013.01); *G06F 18/2148* (2023.01); *G06F 18/22* (2023.01); *G06V 10/761* (2022.01); *G06V 10/82* (2022.01); *G06V 30/1916* (2022.01); *G06V 30/19173* (2022.01); *G06V 30/274* (2022.01)

(58) Field of Classification Search
None
See application file for complete search history.

(56) References Cited

PUBLICATIONS

Sharma, et al., CHATPAINTER: Improving Text To Image Generation Using Dialogue, ICLR 2018, 2018, pp. 1-7 (Year: 2018).*
Hong, et al., How Generative Adversarial Networks and Their Variants Work: An Overview, ACM Comput. Surv. 52, 1, Article 10 (Feb. 2019), pp. 10:1-10:43 (Year: 2019).*

(Continued)

*Primary Examiner* — Wilbert L Starks

(57) ABSTRACT

The disclosure provides a framework or system for learning visual representation using a large set of image/text pairs. The disclosure provides, for example, a method of visual representation learning, a joint representation learning system, and an artificial intelligence (AI) system that employs one or more of the trained models from the method or system. The AI system can be used, for example, in autonomous or semi-autonomous vehicles. In one example, the method of visual representation learning includes: (1) receiving a set of image embeddings from an image representation model and a set of text embeddings from a text representation model, and (2) training, employing mutual information, a critic function by learning relationships between the set of image embeddings and the set of text embeddings.

20 Claims, 2 Drawing Sheets

(56) References Cited

PUBLICATIONS

Chen, et al., Multivariate-Information Adversarial Ensemble for Scalable Joint Distribution Matching, Proceedings of the 36 th International Conference on Machine Learning, Long Beach, California, PMLR 97, May 24, 2019, pp. 1-10 (Year: 2019).*

Wu, et al., Enhanced feature fusion through irrelevant redundancy elimination in intra-class and extra-class discriminative correlation analysis, Neurocomputing, vol. 335, Mar. 28, 2019, pp. 105-118 (Year: 2019).*

Tao, et al., Chi-square Generative Adversarial Network, Proceedings of the 35 th International Conference on Machine Learning, PMLR 80, 2018, pp. 1-10 (Year: 2018).*

Fisher, et al., Boltzmann Encoded Adversarial Machines, 2018, pp. 1-27 (Year: 2018).*

Devlin, et al.; "BERT: Pre-training of Deep Bidirectional Transformers for Language Understanding"; Google AI Language; May 24, 2019; 16 pgs.

Sun, et al.; "VideoBERT: A Joint Model for Video and Language Representation Learning"; Google Research; Apr. 3, 2019; 13 pgs.

Sun, et al.; "Contrastive Bidirectional Transformer for Temporal Representation Learning"; Google Research and Univ. Lyon; Jun. 13, 2019; 10 pgs.

Hjelm, et al.; "Learning deep representations by mutual information estimation and maximization"; MSR Montreal, MRN, MILA, U Toronto, MILA; Published as a conference paper at ICLR; Feb. 22, 2019; 24 pgs.

Lu, et al.; "ViLBERT: Pretraining Task-Agnostic Visiolinguistic Representations for Vision-and-Language Tasks"; Georgia Institute of Technology, Facebook AI Research, Oregon State University; Aug. 6, 2019; 11 pgs.

Ki, et al.; "VisulBERT: A Simple and Performant Baseline for Vision and Language"; University of California Los Angeles, Allen Institute for Artificial Intelligence, Peking University; Aug. 9, 2019; 14 pgs.

* cited by examiner

JOINT REPRESENTATION LEARNING FROM IMAGES AND TEXT

CROSS-REFERENCE TO RELATED APPLICATION

This application claims the benefit of U.S. Provisional Application Ser. No. 62/891,155, filed by Arash Vahdat, et al. on Aug. 23, 2019, entitled "JOINT REPRESENTATION LEARNING FROM IMAGES AND TEXT," commonly assigned with this application and incorporated herein by reference in its entirety.

TECHNICAL FIELD

This application is directed, in general, to machine learning and, more specifically, to visual representation learning.

BACKGROUND

Machine learning is a branch of artificial intelligence (AI) where systems learn from data analysis, identify patterns, and make decisions. Machine learning can be used to automate analytical model building and train AI algorithms. Visual representation learning is a type of machine learning concerned with learning features for the visual domain that can be used such that downstream tasks (e.g., image classification, object detection, segmentation, etc.) are performed with minimal supervision. Current approaches to visual representation learning can be grouped into two categories, supervised learning, and unsupervised or self-supervised learning. In supervised learning category, a large set of labeled images, such as the ImageNet dataset or another similar dataset, is used to pre-train a model on an auxiliary task. A benefit of this approach is that the learned representation can capture the semantically meaningful aspects of the data due to the supervision. However, a disadvantage is that a large collection of annotated images are often required for training the model.

In the unsupervised or self-supervised learning category, unsupervised learning approaches are used where AI algorithms are trained using data that is not classified or labeled. For example, an auxiliary task can be defined based on image denoising, variational auto encoders, or video colorization. A benefit of this approach is that the need for human supervision is minimal. However, a disadvantage is that the learned representation is not necessarily semantically meaningful.

SUMMARY

In one aspect, the disclosure provides a method of visual representation learning. In one example, the method includes: (1) receiving a set of image embeddings from an image representation model and a set of text embeddings from a text representation model, and (2) training, employing mutual information, a critic function by learning relationships between the set of image embeddings and the set of text embeddings.

In another aspect, the disclosure provides a joint representation learning system. In one example, the joint representation learning system includes: (1) a critic function engine configured to train, employing mutual information, a critic function by learning relationships between a set of image embeddings from an image representation model and a set of text embeddings from a text representation model, and (2) a mutual information estimator configured to train at least one of the image representation model and the text representation model by maximizing the mutual information.

In yet another aspect, the disclosure provides an AI system. In one example, the AI system includes: (1) a neural network configured to provide a task employing at least one of a trained image representation model or a trained text representation model, and (2) at least one of the trained image representation model or the trained text representation model, wherein the at least one is trained by employing a compatibility value generated from features extracted from the at least one to maximize mutual information in a joint representation learning system.

BRIEF DESCRIPTION

Reference is now made to the following descriptions taken in conjunction with the accompanying drawings, in which.

DETAILED DESCRIPTION

Figure 1:
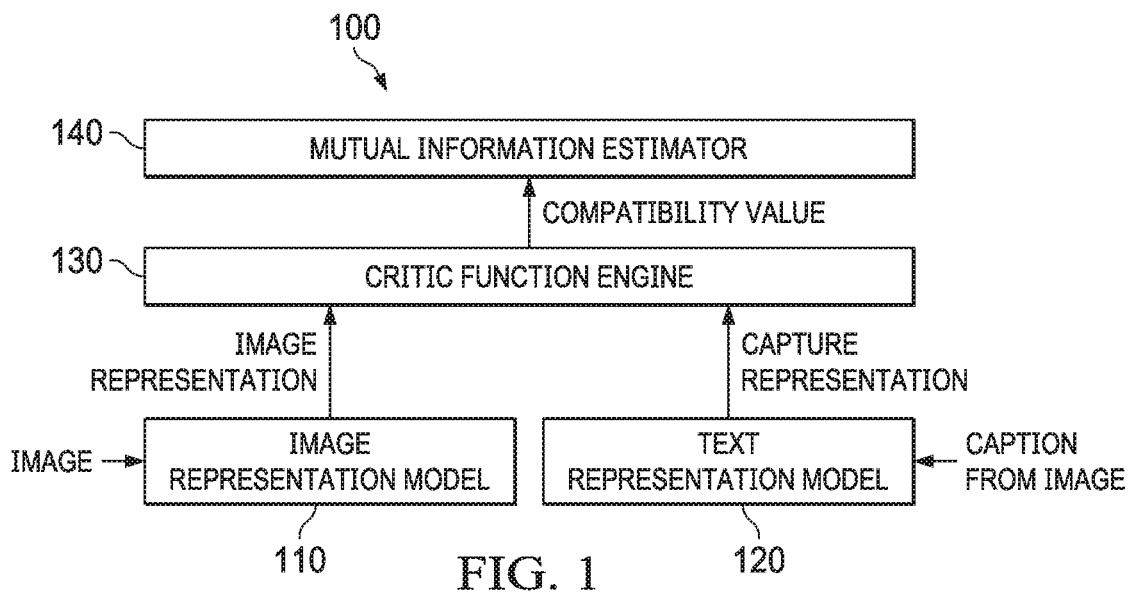
FIG. 1 illustrates a block diagram of an example of a joint representation learning system constructed according to the principles of the disclosure.

The disclosure provides a framework or system for learning visual representation using a large set of image/text pairs. The system and features disclosed herein are based on maximizing the mutual information between text and image representations. The system employs unsupervised representation learning using both text and images. In this system, a large corpus of paired image and text (i.e., image captions) is used for representation learning. A caption is a sentence or phrase that describes an image. For example, if the image shows a banana on a table, the caption can be "A banana on a table." Advantages to this approach of unsupervised visual representation learning using a set of image/text pairs include: i) the learned representation is semantically meaningful due to the semantics injected by text, and ii) the amount of supervision is minimal as image/text pairs can be collected easily, such as from the web.

For example, the disclosure provides a visual representation learning solution that maximizes the mutual information between the image representation and the text representation when training the representation in the joint space. The mutual information between two random variables x and y can be expressed using Equation 1:

$$I(x, y) = \int_x \int_y p(x, y) \log \frac{p(x, y)}{p(x)p(y)} dx dy, \quad (1)$$

where p(x, y) is the joint probability distribution and p(x) and p(y) are the marginal distributions. However, I(x, y) is often challenging to compute. As such, instead of maximizing the mutual information, a lower bound on the mutual information can be maximized. Different lower bound solutions can be used. One possible approach is to use the lower bound provided by the noise contrastive estimation technique as represented by Equation 2:

$$I_{NCE} := \mathbb{E}\left[\frac{1}{K}\sum_{n=1}^{K}\log\frac{e^{f(x_n,y_n)}}{\frac{1}{K}\sum_{k=1}^{K}e^{f(x_n,y_n)}}\right] \leq I(x,y) \quad (2)$$

where $\{(x_i, y_i)\}_{i=1}^{N}$ is a training set with $x \in X$ and $y \in Y$ where X is the domain of the random variable x and similarly Y is the domain of y. Here, $f: X \times Y \rightarrow \mathbb{R}$ is known as the critic function that generates a high scalar value, i.e., the compatibility value, when $x_n$ and $y_n$ belong to the same pair in the training set and $K \leq N$ is the number of training samples used for measuring the $I_{NCE}$ bound. As such, the numerator processes the positive pairs and the numerator processes the negative pairs. Using a lower bound, such as $I_{NCE}$ in Equation 2, the representation learning problem can be reduced to learning the critic function (f). Learning employing Equation 2 can end, for example, when a successive number of iterations produce a minimal designated improvement in the compatibility value. Thus, the output of the critic function is applied to Equation 2, which can be employed by a mutual information estimator. The critic function, the image representation model and the text representation model can all be trained together by maximizing Equation 2. Training together can be training in parallel or at least partially in parallel and indicates that training is occurring in parallel paths but not necessarily simultaneously. Training the critic function involves training the parameters of the critic function. The image representation model and/or the text representation model can be pretrained (fixed) and the critic function can be used to improve the trained models. One or both of the trained image and text representation models can then be used in various implementations, such as image classification, object detection, and image captioning. For example, one or both of the trained image and text representation models can be used in various types of autonomous or semi-autonomous vehicles that are capable of operating with minimal or no human intervention. A vehicle, includes without limitation, automobiles, box trucks, trucks with trailers, drones, ATVs, robotics, indoor robots, airplanes, rockets, missiles, spacecraft, or other types of moving machines.

Turning now to the figures, FIG. 1 illustrates a block diagram of an example of a joint representation learning system 100 constructed according to the principles of the disclosure. The system 100 includes an image representation model 110, a separate text representation model 120, a critic function engine 130, and a mutual information estimator 140. Each of these components can be implemented on a processor or multiple processors. In some examples, a single processor can be used for a combination of the components of the joint representation learning system 100. One or more of the components of the joint representation learning system 100 can be located in a cloud environment for training performed partially or fully in the cloud. Each of the components of the joint representation learning system 100 can also include associated data storage that is typically employed with the processors. The processors can be parallel processing units that include associated data storage. The data storage can include a temporary storage, such as a register file or a memory, that is configured to stage or temporarily store data between the processor and the memory for the operations. The parallel processors can be a different type of general or special processing unit such as a central processing unit (CPU) or a graphics processing unit (GPU).

One or more of the components of the joint representation learning system 100 can be implemented in a data center having GPU racks that include high performance GPU compute nodes and storage nodes. The high performance GPU compute nodes can be servers designed for general-purpose computing on graphics processing units (GPGPU) to accelerate deep learning applications. For example, the GPU compute nodes can be servers of the DGX product line from Nvidia Corporation of Santa Clara, California. The GPU racks can be high-density (HD) GPU racks that can provide the storage and networking needed to support large-scale neural network (NN) training, such as deep neural network (DNN) training, which powers software development for autonomous vehicles, internal AI for companies, robotics development, etc. The disclosed learning representations can be used for NN training for conversational AI products, where learning semantically meaningful representation in the joint space of images and text can be useful for downstream tasks including but not limited to image captioning, visual question answering, and image grounding. The HD-GPU racks can be used with reactive machines, autonomous machines, self-aware machines, and self-learning machines that all require a massive compute intensive server infrastructure. The server structure can be used in a virtual computing platform.

The image representation model 110 can be implemented on a fully convolutional network and can be a conventional model that is used in machine learning for training images, such as images without text. In some examples, the images can be created by ray tracing. Ray tracing can be an alternative or supplement to traditional rendering techniques, such as rasterization. Ray tracing can be described as extending a line, i.e., ray, from the user's view perspective to an object within a scene, and then determining a second ray from that object to a light source. These rays can then be used to determine the amount of light hitting the object, at what angle the light is to the user view perspective, and how the color, texture, and other object characteristics are represented to the user. Accordingly, the images can be rendered images.

The text representation model 120 can be a conventional text model that is used for machine learning training. In its core, the disclosed models can use representation learning approaches proposed for image or text only. Some examples of different approaches that can be used with the disclosed framework are Deep InfoMax or another machine learning framework for images without text annotation, and BERT or another machine learning framework for natural language processing (NLP) for the captions. Deep InfoMax learns representations images by considering the structure and is available from BERT, which is an acronym for Bidirectional Encoder Representations from Transformers is a technique for NLP pre-training developed by Google LLC of Mountain View, California. The critic function engine 130 can be implemented as a DNN. The DNN can be a convolution neural network (CNN) or another type of NN, such as a recursive neural network (RNN).

The critic function engine 130 is configured to learn a compatibility function, referred to herein as a critic function, that compares image representations and caption representations from the image and text representation models 110, 120, and generates a compatibility value based on the comparison. The compatibility value is a scalar value that represents the compatibility or correspondence between the image and caption representations that are compared. The compatibility value, for example, is greater when a representation extracted at a location in the image representation matches a representation extracted from a location of the caption representation, than when the two extracted representations do not match. As discussed with respect to FIG. 2, the image and caption representations can be image embeddings and text embeddings. The critic function engine 130 provides the compatibility value to the mutual information estimator 140.

The mutual information estimator 140 is configured to employ the compatibility value in an estimation of mutual information shared between the image and caption representations, and train the image representation model 110, the text representation model 120, and the critic function engine 130. For example, the mutual information estimator 140 can maximize mutual information between an input and the output of a DNN encoder for the training. The mutual information estimator 140 can provide a quantitative measurement of the amount of information shared between the image and caption representations. Equation 1 provides an example representing the logic employed by the mutual information estimator 140 for an estimation of the shared information, wherein x and y are the extracted features from the image representation model 110 and the text representation model 120. As such, x and y of Equation 1 can be a set of image embeddings and a set of text embeddings. The mutual information estimator 140 can train the image representation model 110, the text representation model 120, and the critic function engine 130 by maximizing the mutual information employing the compatibility value.

The image representation model 110, the text representation model 120, and the critic function of critic function engine 130 can all be trained together by maximizing the mutual information. Instead of maximizing the mutual information, a lower bound of the mutual information can be maximized for the training. Equation 2 provides an example representing the logic that can be used for maximizing the lower bound of the mutual information. In Equation 2, f (x, y) is the critic function wherein x and y can be a set of image embeddings and a set of text embeddings as noted above with Equation 1. As represented by Equation 2, the mutual information estimator 140 can use a noise contrastive estimation technique for maximizing the lower bound.

Figure 2:
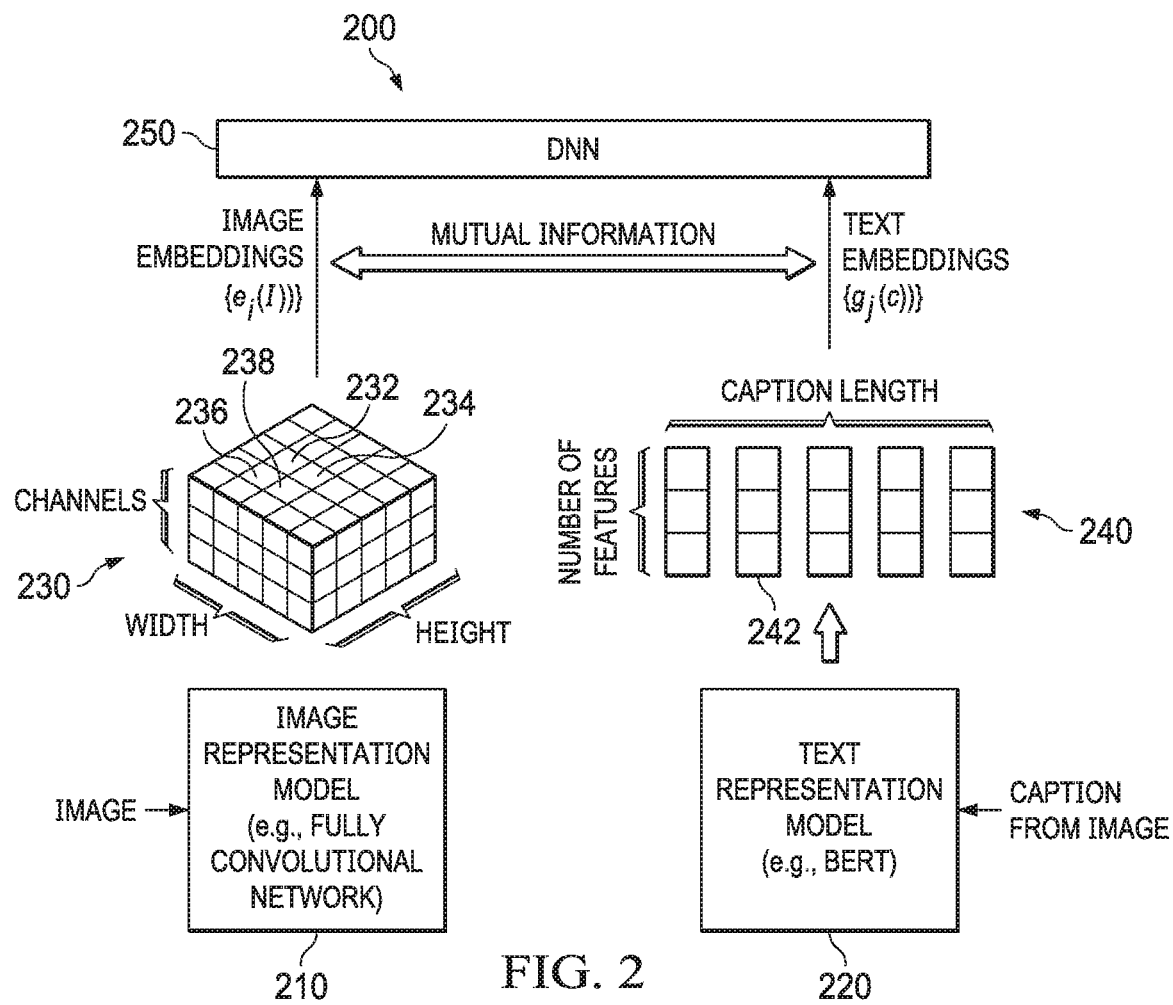
FIG. 2 illustrates a diagram of an example of one implementation of a joint representation learning system constructed according to the principles of the disclosure.

FIG. 2 illustrates a diagram of an example of one implementation of a joint representation learning system 200 constructed according to the principles of the disclosure. The joint representation learning system 200 includes an image representation model 210, a text representation model 220, and a DNN 250. The joint representation learning system 200 employs a similarity measurement determined by the DNN 250 based on mutual information extracted from image and caption representations. The similarity measurement can be used to compute the compatibility value of a critic function using, for example, Equation 3 presented below. The DNN 250 can include a critic function engine such as disclosed in FIG. 1. The image representation model 210 and the text representation model 220 provide examples of the image representation model 110 and the text representation model 120 of FIG. 1.

The image representation model 210 extracts visual features given an image. The image representation model 110 can be, for example, implemented using a fully CNN. The output of the image representation model 210 is a set of spatially organized features, i.e., for each position i in the output, an image embedding $e_i(I)$ is extracted for the image I.

The text representation model 220 extracts features from the language domain. The text representation model 220 is configured to extract contextualized features for each word in a caption that corresponds to the paired image from the image representation model 210. The output of the text representation model 220 is a set of text embeddings $g_j(C)$ where j is an index running over the word indices and C is the caption. Both $e_i(I)$ and $g_j(C)$ are represented by vectors. The text representation model 220 can be implemented, for example, using BERT. The outputs from each model do not have to exactly represent the image or caption. For example, the extracted features, the image and text embeddings, can be down sampled.

As shown in FIG. 2, the image and text representation models 210 and 220 generate image and text embeddings $\{e_i(I)\}$ and $\{g_j(C)\}$ that can be used for training. The image and text embeddings are visually represented by image embeddings 230 and text embeddings 240 as examples. The image embeddings 230 represent features of the image that are extracted by the image representation model 210 at proscribed locations of the image. The image embeddings 230 include a five by five array of pixels of the image that have a number of numerical values representing the features, or channels, for each of the pixels. The numerical values indicate what is located at each particular pixel. For example, if the image is of a banana on a table, then the image representation model 210 can extract numerical values representing the color yellow and the banana texture for pixels 232 and 234 corresponding to the location of the banana in the image. Similarly, the image representation model 210 can extract numerical values representing the color brown and the texture of the table for pixels 236 and 238 corresponding to the location of the table in the image. For the image embeddings 230, three channels are extracted for each pixel. The number of channels extracted can vary depending on the implementation. With more channels, or values, the quality of the representation of a pixel increases.

The text embeddings 240 include five vectors (shown as rectangles) that each uniquely represent one word of the caption. The text representation model 220 extracts one or more features from each word to represent the word. The features are represented by numerical values that are extracted by the text representation model 220 to form each of the vectors. The numerical values are contextual such that the representation of each word depends on the other words, e.g., neighboring words, of the caption. Continuing with the caption of "A banana on a table" as an example, vector 242 corresponds to "banana" and includes numerical values extracted by the text representation model that contextually represents the word "banana" in the caption. As such, the numerical values for vector 242 consider the words "A" and "on". Similarly, each of the other vectors that are not denoted correspond to "A", "on", "a" and "table" and include contextual numerical values representing a single word of the caption. Each of the vector representations provides a semantically meaningful representation of a word of the caption that, for example, should correspond to vector representations of similar words in other captions. The text embeddings 240 include three features for each word of the caption, which are visually represented by boxes in each of the rectangles. The number of features extracted can vary depending on the implementation. With more features, or values, the quality of the representation of a word increases. The number of channels of the image embeddings and the number of features of the text embeddings can be the same. Accordingly, the dot product of the values as represented in Equation 3 is a scalar value.

The framework provided by the joint representation learning system 200 is based on the mutual information to learn representation jointly in the image and text domains. Various modifications can be employed with the framework. For example, while (or before) training the whole image representation model 210, the text representation model 220 using the mutual information between image and text features, a visual representation learning objective function can be used, such as mutual information to train (or pre-train) the image representation model 210. This training does not involve the captions, and it only uses the image domain to train visual features.

Similarly, while (or before) training the whole model, a text representation learning objective function, such as the word masking method used in BERT, can be used to train (or pre-train) the text representation model 220. This training does not involve the visual representation and it only uses the text domain to learn text features.

A critic function is formed in the DNN 250 that compares the set of image embeddings to text embeddings, and generates a compatibility value if they belong to the same pair. The critic function can take the form $f(\{e_i(I)\}, \{g_j(C)\})$. The critic function can use an attention mechanism to attend the different parts of the visual features for generating the compatibility value.

Attention mechanisms can be constructed using key, value, and query attention mechanisms and can be employed by the critic function of the DNN 250. For example, one can use DNNs to generate key and value (denoted by $k_i$ and $v_i$ respectively) for each image embedding $e_i(I)$, and query and value (denoted by $q_j$ and $v'_j$ respectively) for each word embedding $g_j(C)$. We can then compute the attention score using:

$$s_{ij} = \frac{e^{q_j^T k_i}}{\sum_{i'} e^{q_j^T k_{i'}}}$$

where $s_{ij}$ is the output of the attention mechanism and $i'$ runs over all indices of image embeddings. Given $s_{ij}$, this similarity measurement can be then used to aggregate the similarity between all the image and text embeddings for the pair (I, C). The scalar output of the function $f$, the compatibility value, can then be computed using the following expression of Equation 3:

$$f(\{e_i(I)\}, \{g_j(C)\}) = \sum_{ij} s_{ij} v_i^T v'_j \qquad (3)$$

As noted above with respect to FIG. 1, the compatibility value can then be used by a mutual information estimator for maximizing a lower bound of the mutual information. Equation 2 provides an example for maximizing the lower bound, wherein Equation 3 is the critic function f (x, y) in Equation 2. The mutual information estimator can be implemented in the DNN 250 along with the critic function engine.

Given that both the image and text representation models 210, 220, can extract features using DNNs, the mutual information can be maximize at different layers of the DNN 250. Thus, instead of being used on the output layer of the DNN 250, the maximized mutual information can also be used with other layers of the DNN 250. This will enable learning representations at different levels jointly between the text and image domains and increase the granularity.

Figure 3:
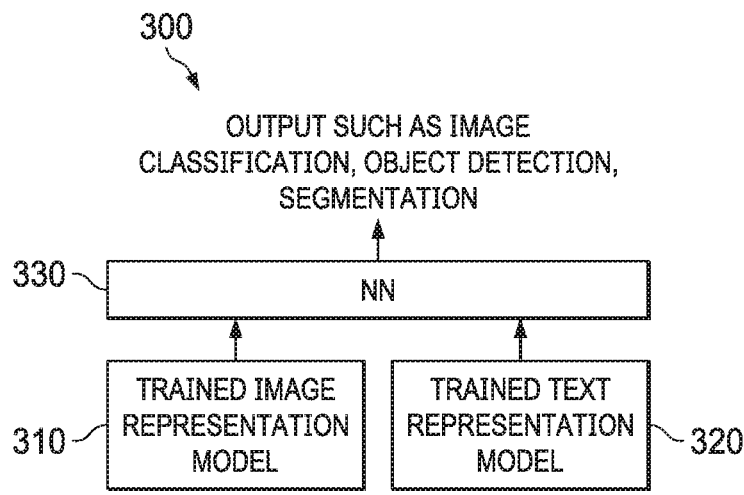
FIG. 3 illustrates a block diagram of an example of an AI system that employs one or more of an image or text representation models trained according to the joint representation learning disclosed herein.

FIG. 3 illustrates a block diagram of an example of an AI system 300 that employs one or more of an image or text representation models trained according to the joint representation learning disclosed herein. The AI system 300 provides a function or downstream task employing one or more of the trained models. The system 300 includes a trained image representation model 310, a text representation model 320 and a NN 330. One or both of the trained image and text representation models 310, 320, can be trained according to the joint representation learning as described herein.

The NN 330 is configured to perform a designated function or task employing at least one of the trained image and text representation models 310, 320. The AI system 300 can be or be part of a conversational A product, where the NN 330 employs the semantically meaningful representations of the trained image and text representation models 310, 320, for tasks including but not limited to image captioning, visual question answering, and image grounding. The NN 330 can also employ one or more of the trained image and text representation models 310, 320, for such tasks as image classification, objection detection, and segmentation. Depending on the application, only the trained image representation model 310, only the trained text representation learning model 320, or both of the trained image and text representation models 310, 320, may be employed by the NN 330 to perform a designated function. For example, in the case of object detection by the NN 330, the trained text representation model 310 is not needed.

The NN 330 can be a DNN or another type of NN that is added to the top of the representation models 310, 320, to perform a downstream task (e.g. object detection). The NN 330, however, is a different NN than the critic function engine used for training the representation models as illustrated in FIG. 2. In fact, after training, the critic function can be discarded and the trained representation models can be used.

Figure 4:
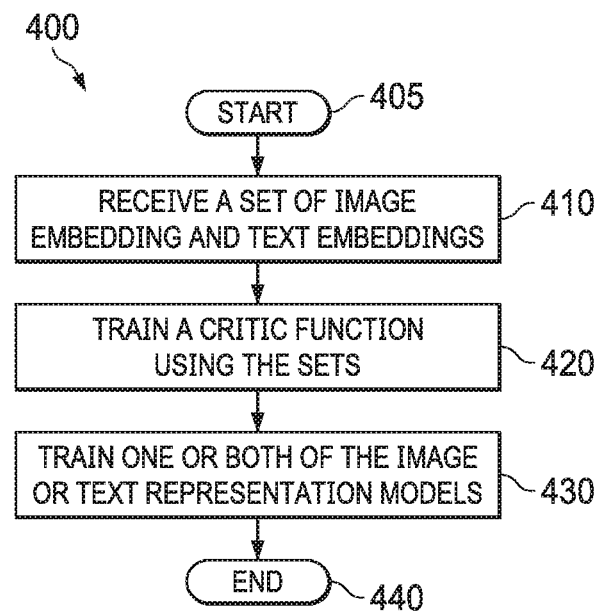
FIG. 4 illustrates a flow diagram of a method of an example of visual representation learning carried out according to the principles of the disclosure.

FIG. 4 illustrates a flow diagram of a method 400 of an example of visual representation learning carried out according to the principles of the disclosure. The method 400 can be carried out, for example, by the joint representation learning system of FIG. 1 or FIG. 2. At least a portion of the method 400 can be performed in a cloud environment where information is communicated between components of a joint representation learning system via communication networks. The method 400 can be provided as a service wherein a representation model or models are trained by a first entity or service provider and provided to another entity or entities for employing in a system for use, such as an A system 300. The method 400 can also be employed in autonomous or semi-autonomous vehicles for various systems that are employed to control operation of the vehicles. The method 400 begins in step 405.

In step 410, a set of image embeddings are received from an image representation model and a set of text embeddings are received from a text representation model. The set of image embeddings and text embeddings can be received from representation models that are fixed (pre-trained). One or both of the set of image embeddings and text embeddings can also be extracted as part of the method 400.

A critic function is trained in a step 420 by learning relationships between the set of image embeddings and the set of text embeddings. The critic function can include an attention score generated by an attention mechanism employed with the image embeddings. Equation 3, for example, can be used to define the critic function. Mutual information between the set of image embeddings and the set of text embeddings can be employed for training the critic function. For example, maximizing a lower bound of the mutual information can be employed to train the critic function. Equation 2 provides an example for maximizing the lower bound of the mutual information for training the critic function. As such, the maximizing can employ a noise contrastive estimation technique. Training of the critic function provides a compatibility value that a mutual information estimator can employ for maximizing the mutual information.

In a step 430, one or more of the image representation model and the text representation model are trained employing the mutual information. Both of the image representation model and the text representation model can be trained. If already trained (pre-trained) training of one of more of the models can be performed to improve performance.

The method 400 continues to step 440 and ends. The trained image and text representation models can be used in an AI system, such as illustrated in FIG. 3.

The disclosed methods, systems, solutions, provided herein advantageously employs mutual information for representation learning jointly in the space of images and text. As described herein, a noise contrastive estimation technique can be used for maximizing the mutual information. Additionally, an attention-based mechanism can be used to attend different regions of an image and to use the output of the attention to aggregate the features for representation learning using mutual information. The disclosed learning representation can be used with conversational AI products, where learning semantically meaningful representation in the joint space of images and text can be useful for many downstream tasks including but not limited to image captioning, visual question answering, image grounding, etc.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

The processors or computers can be comprised of one or more GPUs, one or more CPUs, one or more of other processor types, or a combination thereof. The processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip.

The NNs disclosed herein include multiple layers of connected nodes that can be trained with input data to solve complex problems. For example, the image and text embeddings can be used with the critic function for training of the image and text representation models. Once trained, the NNs (the image and text representation models) can be deployed and used to identify and classify objects or patterns in an inference process through which a NN extracts useful information from a given input.

During training, data flows through the NNs in a forward propagation phase until a prediction is produced that indicates a label corresponding to the input. When the NNs do not correctly label the input, errors between the correct label and the predicted label are analyzed, and the weights are adjusted for features of the layers during a backward propagation phase that correctly labels the inputs in a training dataset. With thousands of processing cores that are optimized for matrix math operations, GPUs such as noted above are capable of delivering the performance required for training NNs for artificial intelligence and machine learning applications, including joint representation learning from images and text pairs.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein. Those skilled in the art to which this application relates will appreciate that other and further additions, deletions, substitutions and modifications may be made to the described embodiments.

What is claimed is:

1. A method of visual representation learning, comprising:
receiving a set of image embeddings from an image representation model and a set of text embeddings from a text representation model; and
training, using a neural network and employing mutual information, a critic function by learning relationships between the set of image embeddings and the set of text embeddings.

2. The method as recited in claim 1, wherein the mutual information is a quantitative measurement of an amount of information shared between the text embeddings and the image embeddings.

3. The method as recited in claim 1, wherein the training includes maximizing a lower bound of the mutual information.

4. The method as recited in claim 3, wherein the maximizing employs a noise contrastive estimation technique.

5. The method as recited in claim 1, wherein the critic function employs an attention mechanism to generate a similarity measurement between each image embedding of the set of image embeddings and each text embedding of the set of text embeddings.

6. The method as recited in claim 5, wherein the critic function provides a scalar value based on a summation of the similarity measurements of the image and text embeddings, and a dot product of the set of image embeddings and the set of text embeddings.

7. The method as recited in claim 1, further comprising extracting at least one of the text embeddings from the text representation model or the image embeddings from the image representation model.

8. The method as recited in claim 1, further comprising training at least one of the image representation model or the text representation model employing the mutual information.

9. The method as recited in claim 8, wherein one or more of the image representation model or the text representation model are pre-trained and the training of the image representation model or the text representation model is additional training that improves the image representation model or the text representation model.

10. The method as recited in claim 1, further comprising training the image representation model, the text representation model, and the critic function together employing the mutual information.

11. The method as recited in claim 1, wherein the training is performed by at least one deep neural network.

12. A joint representation learning system, comprising:
one or more processors to perform one or more operations including:
training, employing mutual information, a critic function by learning relationships between a set of image embeddings from an image representation model and a set of text embeddings from a text representation model; and
training at least one of the image representation model and the text representation model by maximizing the mutual information, wherein training the critic function and training the one or more models uses one or more neural networks.

13. The joint representation learning system as recited in claim 12, wherein training the at least one of the image representation model and the text representation model includes training both the image representation model and the text representation model.

14. The joint representation learning system as recited in claim 12, further comprising the image representation model and the text representation model.

15. The joint representation learning system as recited in claim 12, wherein maximizing the mutual information is performed by maximizing a lower bound of the mutual information.

16. The joint representation learning system as recited in claim 12, wherein the critic function employs an attention score generated by an attention mechanism employed with the image embeddings.

17. The joint representation learning system as recited in claim 12, wherein the training of the critic function provides a compatibility value and maximizing the mutual information employs the compatibility value.

18. The joint representation learning system as recited in claim 12, wherein the critic function provides a scalar value based on a summation of similarity measurements of the image and text embeddings, and a dot product of the set of image embeddings and the set of text embeddings.

19. An artificial intelligence computing system, comprising:
one or more processors to perform one or more operations including:
training at least one of an image representation model or a text representation model using a neural network, wherein the training includes employing a compatibility value generated from features extracted from the at least one to maximize mutual information in a joint representation learning system; and
providing a task employing at least one of the trained image representation model or the trained text representation model.

20. The artificial intelligence computer system as recited in claim 19, further comprising both of the trained image representation model or the trained text representation model.

* * * * *

UNITED STATES PATENT AND TRADEMARK OFFICE
CERTIFICATE OF CORRECTION

PATENT NO. : 11,948,078 B2
APPLICATION NO. : 17/000048
DATED : April 2, 2024
INVENTOR(S) : Arash Vahdat et al.

It is certified that error appears in the above-identified patent and that said Letters Patent is hereby corrected as shown below:

In the Specification

In Column 8, Line 20, after --conversational-- delete "A" and insert --AI--

In Column 8, Line 54, after --such as an-- delete "A system" and insert --AI system--

Signed and Sealed this
Third Day of September, 2024

Katherine Kelly Vidal
Director of the United States Patent and Trademark Office